(12) United States Patent
Li et al.

(10) Patent No.: US 11,290,222 B2
(45) Date of Patent: Mar. 29, 2022

(54) METHOD OF SIDELINK COMMUNICATIONS BY USER EQUIPMENT

(71) Applicant: National Chung-Shan Institute of Science and Technology, Taoyuan (TW)

(72) Inventors: Jhih-Lin Li, Taoyuan (TW); Shao-Yu Lien, Pingtung County (TW); Chia-Ling Wu, Taoyuan (TW); Yueh-Jir Wang, Taoyuan (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 82 days.

(21) Appl. No.: 16/812,390

(22) Filed: Mar. 9, 2020

(65) Prior Publication Data
US 2021/0281366 A1  Sep. 9, 2021

(51) Int. Cl.
*H04W 4/00* (2018.01)
*H04L 1/18* (2006.01)
*H04W 76/14* (2018.01)
*H04W 72/12* (2009.01)
*H04L 47/283* (2022.01)
*H04W 72/04* (2009.01)
*H04L 5/00* (2006.01)

(52) U.S. Cl.
CPC .......... *H04L 1/1887* (2013.01); *H04L 5/0055* (2013.01); *H04L 47/283* (2013.01); *H04W 72/0446* (2013.01); *H04W 72/1205* (2013.01); *H04W 76/14* (2018.02)

(58) Field of Classification Search
CPC ............... H04L 1/1887; H04L 72/1205; H04L 72/0446; H04L 76/14; H04L 5/0055; H04L 47/283
USPC ....................................................... 370/329
See application file for complete search history.

(56) References Cited

U.S. PATENT DOCUMENTS

| 2009/0064177 | A1* | 3/2009 | Bauer | G06F 9/545 719/313 |
| 2020/0236694 | A1* | 7/2020 | Wu | H04W 72/1289 |
| 2020/0351028 | A1* | 11/2020 | Wang | H04L 5/0055 |
| 2021/0028891 | A1* | 1/2021 | Zhou | H04L 1/1854 |
| 2021/0099348 | A1* | 4/2021 | Bhattad | H04W 72/0446 |

* cited by examiner

*Primary Examiner* — Mang Hang Yeung
(74) *Attorney, Agent, or Firm* — Winston Hsu

(57) ABSTRACT

A method of sidelink communications by a plurality of user equipment (UE) without the control of a base station in a wireless communication system is disclosed. In one embodiment, the UE being a scheduler end is configured to allocate the resources for initial/repeated transmissions and ACK/NACK messages, and also transmit information regarding the allocated resources to both the UEs being a transmitter end and a receiver end. In one embodiment, retransmission is performed when none of the scheduler and transmitter ends has received the ACK message sent by the receiver end, so as to minimize redundant retransmission in consideration of transmission reliability. In one embodiment, retransmission is performed when at least one of the scheduler and transmitters end has received the NACK message sent by the receiver end before the retransmission timer has reached to zero, so as to minimize transmission latency.

4 Claims, 5 Drawing Sheets

METHOD OF SIDELINK COMMUNICATIONS BY USER EQUIPMENT

BACKGROUND OF THE INVENTION

1. Field of the Invention

The present invention relates to a method of sidelink communications, and more particularly, to a method of sidelink communications by user equipment.

2. Description of the Prior Art

An effective retransmission mechanism plays an important role in order to realize Ultra-Reliable and Low Latency Communication (URLLC). In a wireless communication system, after a transmitter end has transmitted data to a receiver end, the receiver end must report whether the data has been received successfully to the transmitter end. For example, the receiver end transmits an acknowledgement (ACK) message to the transmitter end to report a successful transmission/reception, thereby the transmitter end does not perform retransmission when the ACK message is received; while the receiver end transmits a negative-acknowledgement (NACK) message to the transmitter end to report a failure transmission/reception, thereby the transmitter end performs retransmission when the NACK message is received. Further, repeated transmission refers to the situation that the transmitter end transmits the same data package multiple times in order to reduce the error rate at the receiver end; for example, the receiver end may perform data recover according to the same multiple data packages.

A critical issue for retransmission is acquiring information regarding the allocated wireless communication resources for both of the transmitter end and receiver end. Typically, a base station (BS) in the wireless communication system is in charge of resource allocation and allocation information transmission for any user equipment (UE) in the wireless communication system, wherein the UE may be the transmitter end or the receiver end. Specifically, the BS may allocate physical downlink control channel (PDCCH) resources and physical uplink control channel (PUCCH) resources for data transmission and ACK/NACK message transmission to the UEs. Then, the BS transmits information regarding the allocated resources (e.g., the location of the allocated resources) to the UEs, such that the UE (e.g., the receiver end) is able to receive data through the allocated PDCCH and transmit the ACK/NACK message through the allocated PUCCH. The BS also allocates resources for data retransmission to the UE(s), such the UEs are able to perform retransmission through the allocated resources.

However, a flying drone implementing the UE may frequently change its wireless communication channel in order to maintain connections between other drones and the BS. In such a situation, some of the UE(s) cannot receive signals from the BS during channel switch, thereby some of the UE(s) cannot acquire information regarding the allocated resources from the BS during channel switch.

Unfortunately, the receiver end cannot transmit the ACK/NACK message to the transmitter end when it does not receive information regarding the allocated resources from the BS during channel switch, and the transmitter end waits until a retransmission timer reaches to zero to perform retransmission no matter the transmission/reception is succeeded or failed, which causes transmission latency. Moreover, the transmitter end cannot stop retransmission until the ACK message is received from the receiver end, which leads redundant retransmission.

Therefore, how to perform sidelink communications by the user equipment has become an issue in the industry.

SUMMARY OF THE INVENTION

It is therefore an objective of the present invention to provide a method of sidelink communications by user equipment.

The present invention discloses a method of sidelink communication for a first user equipment being a scheduler end in a wireless communication system. The method includes allocating resources for an initial transmission according to a transmission request sent by a second user equipment being a transmitter end in the wireless communication system, and starting a retransmission timer; at a round trip time, checking whether an acknowledgment (ACK) message or a negative-acknowledgment (NACK) message or none of them is received from a third user equipment being a receiver end in the wireless communication system; and determining whether to perform a retransmission according to the ACK message, the NACK message and the retransmission timer.

The present invention further discloses a method of sidelink communication for a first user equipment being a transmitter end in a wireless communication system. The method includes performing an initial transmission to a second user equipment being a receiver end in the wireless communication system according to allocated resources from a third user equipment being a scheduler end in the wireless communication system, and starting a retransmission timer; at a round trip time, checking whether an acknowledgment (ACK) message or a negative-acknowledgment (NACK) message or none of them is received from the receiver end; and determining whether to perform a retransmission according to the ACK message, the NACK message and the retransmission timer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
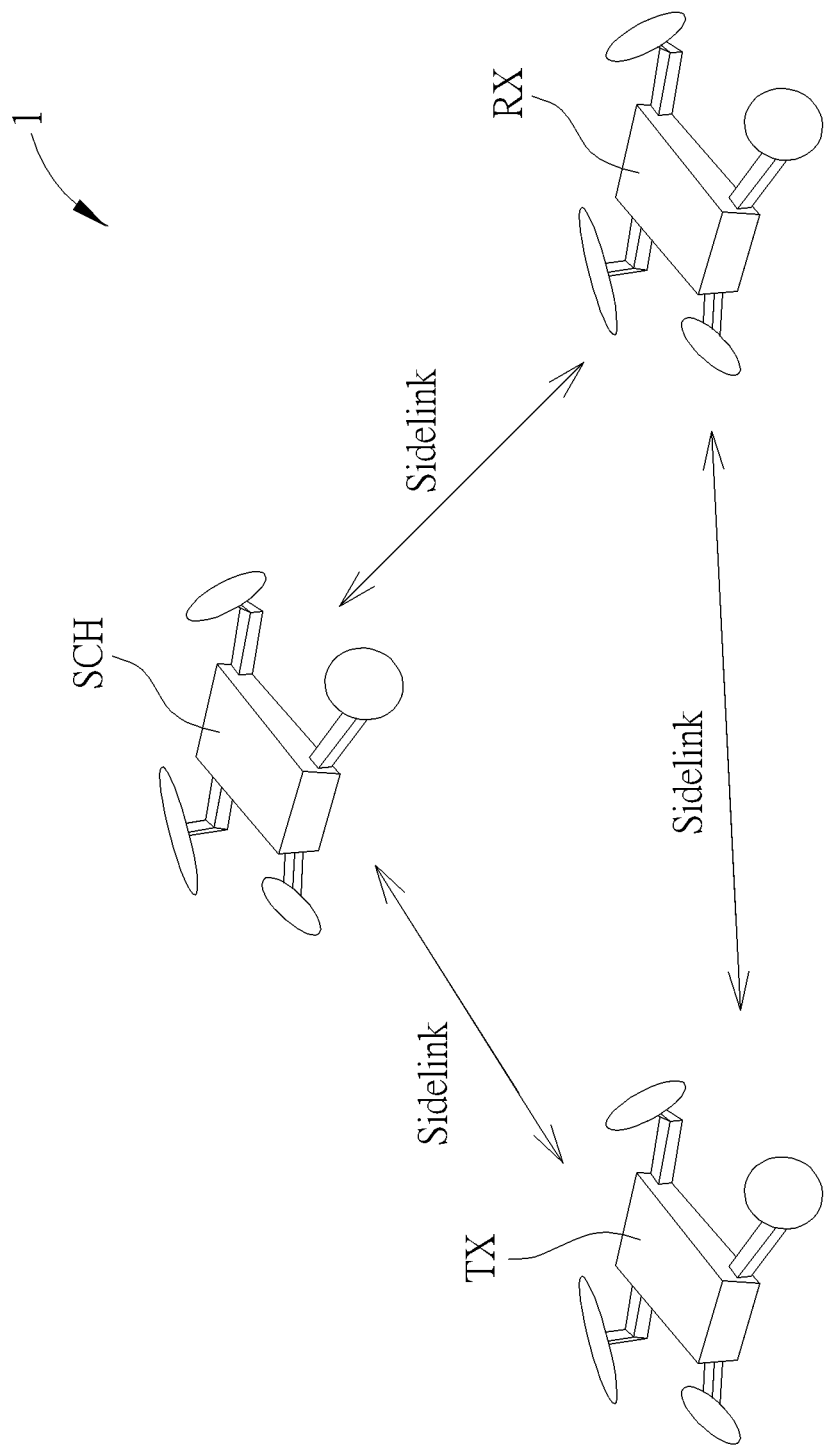
FIG. 1 is a schematic diagram of a wireless communication system according to an embodiment of the present invention.

FIG. 1 is a schematic diagram of a wireless communication system 1 according to an embodiment of the present invention. The wireless communication system 1 includes a plurality of user equipments (UE). The plurality of UE may be a plurality of moving wireless communication devices (e.g., flying drones) capable of performing wireless communication with a base station (not shown in FIG. 1) through uplink and downlink connections, and the plurality of UE is also capable of performing wireless communication with each other though sidelink connections. The plurality of UE includes a scheduler end SCH, at least one transmitter end TX, and at least one receiver end RX.

Figure 2:
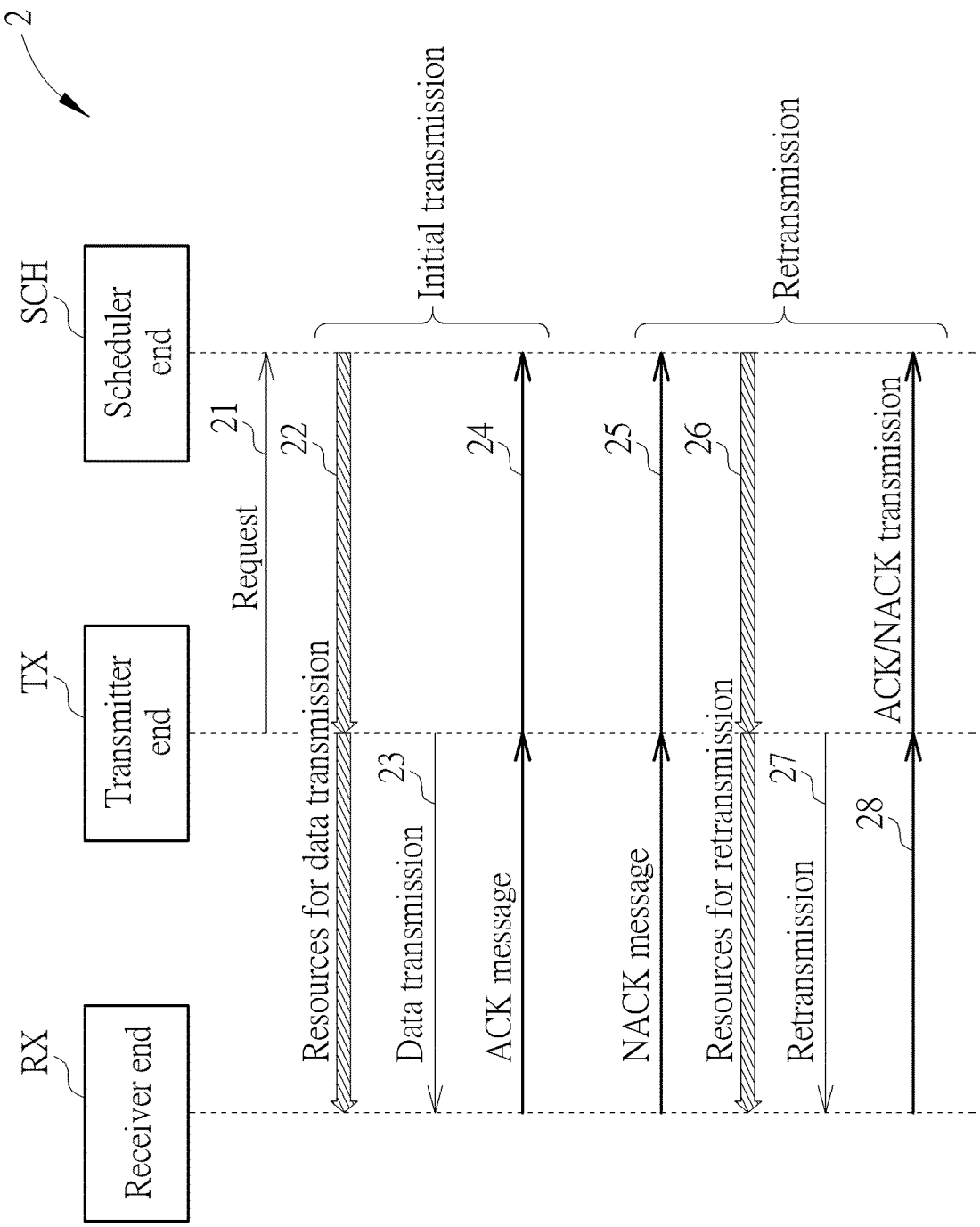
FIG. 2 is a signal flow diagram for sidelink communication according to an embodiment of the present invention.

FIG. 2 is a signal flow diagram for sidelink communication according to an embodiment of the present invention. A process of sidelink transmission in the wireless communication system 1 includes steps 21 to 28, wherein step 22 to step 24 describe an initial transmission operation, and step 25 to step 28 describe a retransmission operation. In step 21, the transmitter end TX transmits a request for sidelink transmission to the scheduler end SCH. In step 22, the scheduler end SCH allocates resources for data transmission (including data and corresponding acknowledgment (ACK) message or negative-acknowledgment (NACK) message) to the transmitter end TX and the receiver end RX according to the request from the transmitter end TX. In step 23, the transmitter end TX performs data transmission to the receiver end RX according to the allocated resources. In step 24, the receiver end RX transmits the ACK message to both of the scheduler end SCH and the transmitter end TX after a successful data transmission is made. The scheduler end SCH and the transmitter end TX check whether the ACK or NACK message is received or not once a round trip time (RTT) is due, so as to determine whether to perform retransmission. In step 25, the receiver end RX transmits the NACK message to both of the scheduler end SCH and the transmitter end TX after a failure data transmission is made. In step 26, the scheduler end SCH allocates resources for retransmission (including data and corresponding ACK/NACK message) to the transmitter end TX and the receiver end RX according to the NACK message sent by the receiver end RX. In step 27, the transmitter end TX performs retransmission to the receiver end RX according to the allocated resources. In step 28, the receiver end RX transmits the ACK or NACK message to both of the scheduler end SCH and the transmitter end TX to report whether retransmission is succeeded or failed. Note that a retransmission timer starts and stops once the ACK/NACK message is received by the scheduler end SCH and the transmitter end TX, wherein retransmission is performed when the retransmission timer reaches to zero, and retransmission is terminated when the ACK message corresponding to the data transmission is received by at least one of the scheduler end SCH and the transmitter end TX.

When a successful transmission/reception is made, the receiver end RX transmits the ACK message to both of the scheduler end SCH and the transmitter end TX. However, the scheduler end SCH and the transmitter end TX may not receive the ACK message due to channel switch or any possible transmission failure, and there are four possible scenarios for the scheduler end SCH and the transmitter end TX as follows.

Scenario I: Both of the scheduler end SCH and the transmitter end TX successfully receive the ACK message sent by the receiver end RX.

Scenario II: None of the scheduler end SCH and the transmitter end TX receives the ACK message sent by the receiver end RX.

Scenario III: Only the scheduler end SCH successfully receives the ACK message sent by the receiver end RX.

Scenario IV: Only the transmitter end TX successfully receives the ACK message sent by the receiver end RX.

Regarding Scenario I, when both of the scheduler end SCH and transmitter end TX do receive the ACK message, the scheduler end SCH does not allocate any resources for retransmission, then retransmission is not performed.

Regarding Scenario II, since none of the scheduler end SCH and the transmitter end TX receives the ACK message, there is no evidence indicating whether the transmission is successful or not, then retransmission should be performed in consideration of transmission reliability. In this case, the scheduler end SCH allocates resources for retransmission and transmits information regarding the allocated resources to the transmitter end TX, so as to maintain transmission reliability of the wireless communication system 1.

Regarding Scenario III, since the scheduler end SCH does not receive the ACK message, the scheduler end SCH allocates resources for retransmission and transmits information regarding the allocated resources to the transmitter end TX; however, the transmitter end TX ignores the allocated resources for retransmission according to the ACK message sent by the receiver end RX, then retransmission is not performed to avoid redundant retransmission.

Regarding Scenario IV, the scheduler end SCH does not allocate resources for retransmission according to the ACK message sent by the receiver end RX; while the transmitter end TX performs channel test on which the sidelink connection is made between the transmitter end TX and the scheduler end SCH in search of resources for retransmission when the transmitter end TX does not receive the ACK message sent by the receiver end RX. When the transmitter end TX confirms that the channel test indicating no resources for retransmission is allocated from the scheduler end SCH, the transmitter end TX determines that the successful transmission/reception is made, then retransmission is not performed to avoid redundant retransmission.

According to Scenarios I to IV, for the successful transmission/reception, retransmission is performed when both of the scheduler end SCH and the transmitter end TX do not receive the ACK message sent by the receiver end RX, so as to maintain transmission reliability. On the other hand, retransmission is not performed when at least one of the scheduler end SCH and the transmitter end TX does receive the ACK message sent by the receiver end RX, so as to avoid redundant retransmission. Further, given that the duration of retransmission is greater than the duration of round trip time (RTT), the scheduler end SCH and the transmitter end TX periodically check whether the ACK message is received once the RTT is due, and the retransmission timer could be terminated when the ACK message is received before the retransmission timer reaches to zero, so as to minimize redundant retransmission.

When a failure transmission/reception is made, the receiver end RX transmits the NACK message to both of the scheduler end SCH and the transmitter end TX. However, the scheduler end SCH and the transmitter end TX may not receive the NACK message due to channel switch or any possible transmission failure, and there are four possible scenarios for the scheduler end SCH and the transmitter end TX as follows.

Scenario V: Both of the scheduler end SCH and the transmitter end TX successfully receive the NACK message sent by the receiver end RX.

Scenario VI: None of the scheduler end SCH and the transmitter end TX receives the NACK message sent by the receiver end RX.

Scenario VII: Only the scheduler end SCH successfully receives the NACK message sent by the receiver end RX.

Scenario VIII: Only the transmitter end TX successfully receives the NACK message sent by the receiver end RX.

Regarding Scenario IV, retransmission is performed when both of the scheduler end SCH and the transmitter end TX do receive the NACK message sent by the receiver end RX. In this case, the scheduler end SCH allocates resources for retransmission and transmits information regarding the allocated resources to the transmitter end TX.

Regarding Scenario VI, retransmission is performed when none of the scheduler end SCH and the transmitter end TX does receive the NACK message once the retransmission timer reaches to zero.

Regarding Scenario VII, retransmission is performed when the scheduler end SCH receives the NACK message sent by the receiver end RX. Specifically, the scheduler end SCH allocates resources for retransmission and transmits information regarding the allocated resources to the transmitter end TX once the NACK message is received. The transmitter end TX performs channel test on which the sidelink connection is made between the transmitter end TX and the scheduler end SCH in search of resources for retransmission when the transmitter end TX does not receive the NACK message sent by the receiver end RX.

Regarding Scenario VIII, retransmission is performed when the transmitter end TX receives the NACK message sent by the receiver end RX. Specifically, the transmitter end TX transmits a request of resources for retransmission to the scheduler end SCH once the NACK message is received.

According to Scenarios IV to VIII, for the failure transmission/reception, retransmission is performed once at least one of the scheduler end SCH and the transmitter end TX receives the NACK message or the retransmission timer reaches to zero. Further, given that the duration of retransmission is greater than the duration of round trip time (RTT), the scheduler end SCH and the transmitter end TX periodically check whether the NACK message is received once the RTT is due, and retransmission could be performed when the NACK message is received before the retransmission timer reaches to zero, so as to minimize transmission latency. In other words, retransmission could be performed as long as one of the scheduler end SCH and the transmitter end TX receives the NACK message, they do not have to wait until the retransmission timer reaches to zero to perform retransmission.

Figure 3:
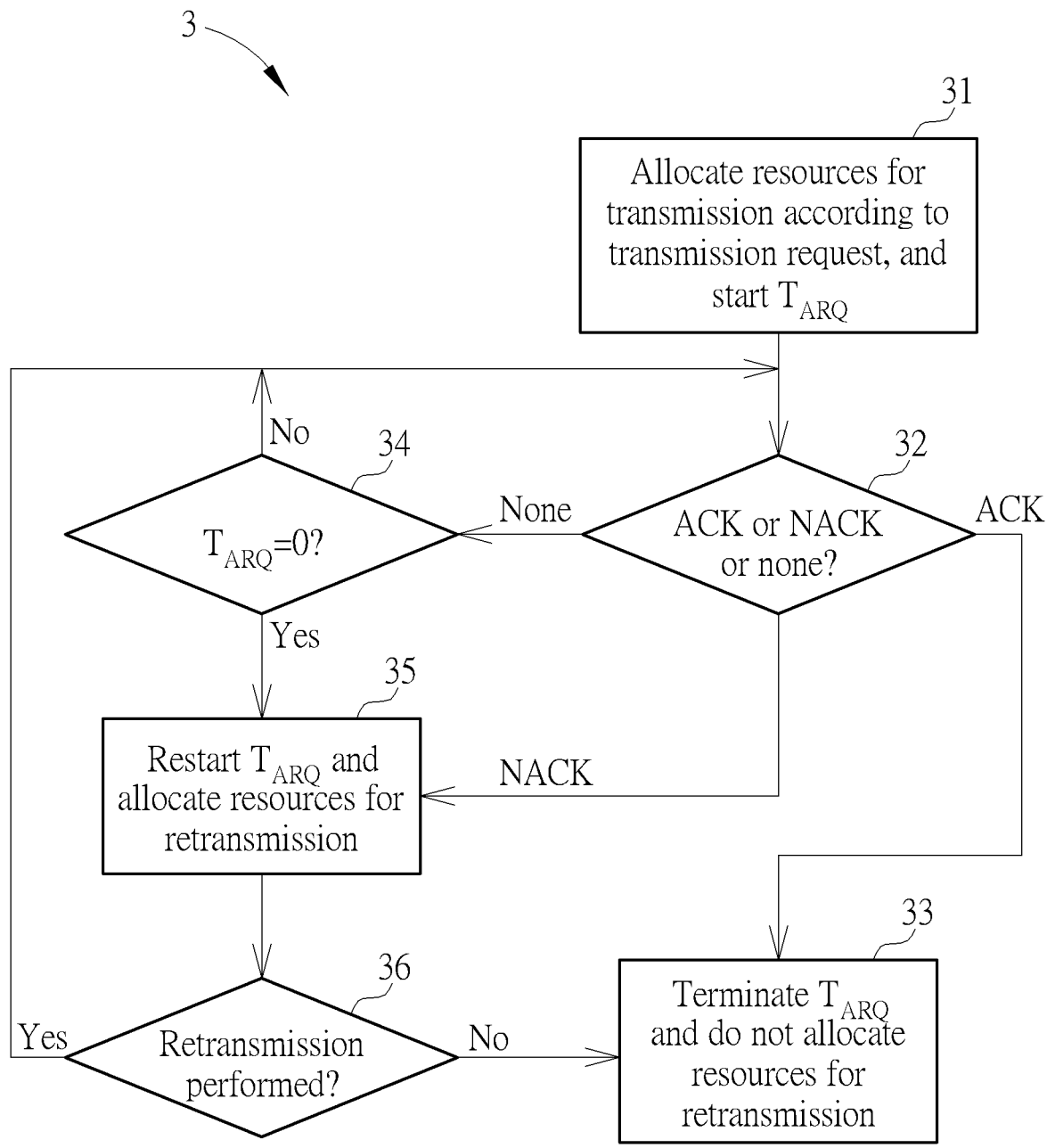
FIG. 3 is a flowchart of a sidelink communication process for a scheduler end according to an embodiment of the present invention.

Operations of the scheduler end SCH may be summarized into a sidelink communication process 3 as shown in FIG. 3, the sidelink communication process 3 includes steps as follows.

Step 31: Allocate resources for transmission according to a transmission request sent by the transmitter end, and start a retransmission timer $T_{ARQ}$.

Step 32: At every round trip time, check if the ACK message or the NACK message or none of them is received from the receiver end? Go to Step 33 if the ACK message is received; go to Step 35 if the NACK message is received; go to Step 34 if none of them is received.

Step 33: Terminate the retransmission timer $T_{ARQ}$ and do not allocate resources for retransmission. End.

Step 34: Check whether the retransmission timer $T_{ARQ}$ has reached to zero? Go to Step 35 if yes; return to Step 32 if no.

Step 35: Allocate resources for retransmission to the transmitter end and the receiver end and restart the retransmission timer $T_{ARQ}$.

Step 36: Check whether retransmission is performed by the transmitter end? Return to Step 32 if yes, return to Step 33 if no.

In Step 31, the scheduler end SCH allocates resources for data (initial) transmission to the transmitter end TX and the receiver end RX according to a transmission request sent by the transmitter end TX. From Step 32 to Step 33, the scheduler end SCH terminates the retransmission timer $T_{ARQ}$ and do not perform retransmission when the ACK message is received at one round trip time and before the retransmission timer $T_{ARQ}$ has reached to zero, in this case the scheduler end SCH confirms that the data (initial) transmission has been completed successfully. From Step 32, Step 33 to Step 36, the scheduler end SCH allocates resources for retransmission to the transmitter end TX and the receiver end RX and restarts the retransmission timer $T_{ARQ}$ when the NACK message is received before the retransmission timer $T_{ARQ}$ has reached to zero, in this case the scheduler end SCH confirms that the data (initial) transmission is failed. From Step 32, Step 34 to Step 35, the scheduler end SCH allocates resources for retransmission to the transmitter end TX and the receiver end RX when none of the ACK and NACK messages is received and the retransmission timer $T_{ARQ}$ has reached to zero. From Step 34 to Step 32, the scheduler end SCH checks whether the ACK and NACK messages or none of them is received again when the retransmission timer $T_{ARQ}$ has not reached to zero. In Step 36, the scheduler end SCH checks whether retransmission is performed after the resources for retransmission has been allocated. In one embodiment, the scheduler end SCH performs channel test (e.g., channel power measurement) to check whether retransmission is performed, wherein retransmission is performed when the channel power (of a sidelink channel on which the retransmission is performed) does reach to a predetermine threshold. From Step 36 to Step 33, the scheduler end SCH terminates the retransmission timer $T_{ARQ}$ and do not allocate resources for retransmission when the result of channel test indicating retransmission is not performed. From Step 36 to Step 32, at every round trip time, the scheduler end SCH checks whether the ACK message or the NACK message is received from the receiver end to check whether retransmission is succeeded or not.

Therefore, by performing the sidelink communication process 3, the scheduler end SCH is able to perform sidelink communications (including resources allocation and transmission coordination) with the transmitter end TX and the receiver end RX without the control of the base station.

Figure 4:
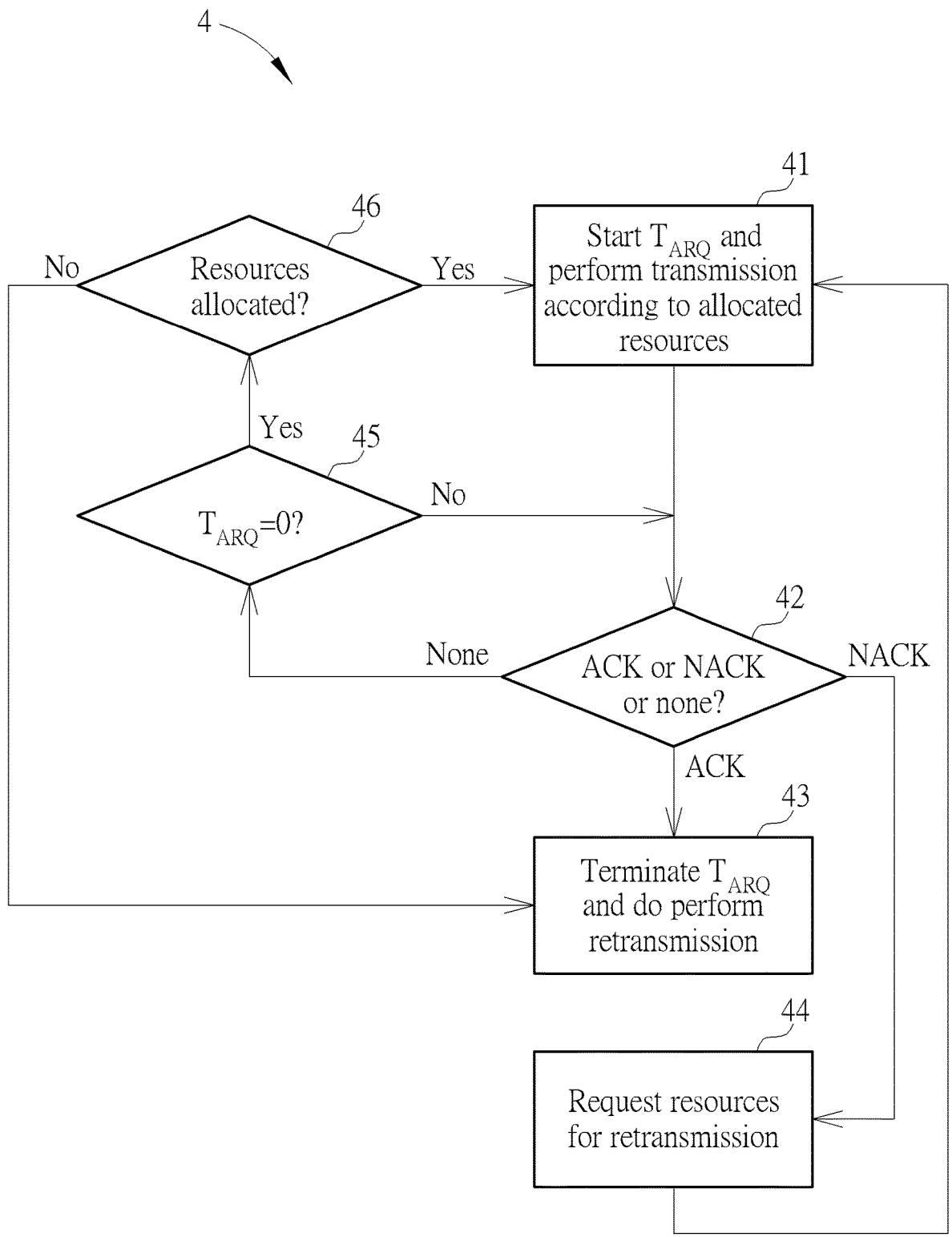
FIG. 4 is a flowchart of a sidelink communication process for a transmitter end according to an embodiment of the present invention.

Operations of the transmitter end TX may be summarized into a sidelink communication process 4 as shown in FIG. 4, the sidelink communication process 4 includes steps as follows.

Step 41: Perform transmission (initial transmission or retransmission) to the receiver end according to allocated resources from the scheduler end, and start a retransmission timer $T_{ARQ}$.

Step 42: At every round trip time, check if the ACK message or the NACK message or none of them is received from the receiver end? Go to Step 43 if the ACK message is received; go to Step 44 if the NACK message is received; go to Step 45 if none of them is received.

Step 43: Terminate the retransmission timer $T_{ARQ}$ and do not perform retransmission. End.

Step 44: Request resources for retransmission from the scheduler end. Return to Step 41.

Step 45: Check whether the retransmission timer $T_{ARQ}$ has reached to zero? Go to Step 46 if yes; return to Step 42 if no.

Step 46: Check whether resources for retransmission are allocated? Return to Step 41 if yes; return to Step 43 if no.

In Step 41, the transmitter end TX performs data (initial) transmission to the receiver end RX according to allocated resources from the scheduler end SCH, and starts the retransmission timer $T_{ARQ}$. From Step 42 to Step 43, the transmitter end TX terminates the retransmission timer $T_{ARQ}$ and do not perform retransmission when the ACK message is received at one round trip time and before the retransmission timer $T_{ARQ}$ has reached to zero, in this case the transmitter end TX confirms that the data (initial) transmission has been completed successfully. From. Step 42 to Step 44, the transmitter end TX requests resources for retransmission when the NACK message is received at one round trip time and before the retransmission timer $T_{ARQ}$ has reached to zero, in this case the transmitter end TX confirms that the data (initial) transmission is failed. From Step 42 to Step 45, the transmitter end TX checks whether the retransmission timer $T_{ARQ}$ has reached to zero when none of the ACK and NACK messages is received from the receiver end. From Step 45, Step 46 to Step 41, the transmitter end TX starts the retransmission timer $T_{ARQ}$ and performs retransmission to the receiver end RX according to allocated resources from the scheduler end SCH when there are resources allocated from the scheduler end SCH and the retransmission timer $T_{ARQ}$ has reached to zero. In one embodiment, the transmitter end TX performs channel test (e.g., channel power measurement) in search of allocated resources from the scheduler end SCH. From Step 45 to Step 42, the transmitter end TX checks whether the ACK and NACK messages or none of them is received again when the retransmission timer $T_{ARQ}$ has not reached to zero. From Step 45, Step 46 to Step 43, the transmitter end TX terminates the retransmission timer $T_{ARQ}$ and do not perform retransmission when there is no resource allocated from the scheduler end SCH and the retransmission timer $T_{ARQ}$ has reached to zero.

Therefore, by performing the sidelink communication process 4, the transmitter end TX is able to perform sidelink communications (including resources reception and transmission performance) with the scheduler end SCH and the receiver end RX without the control of the base station.

Figure 5:
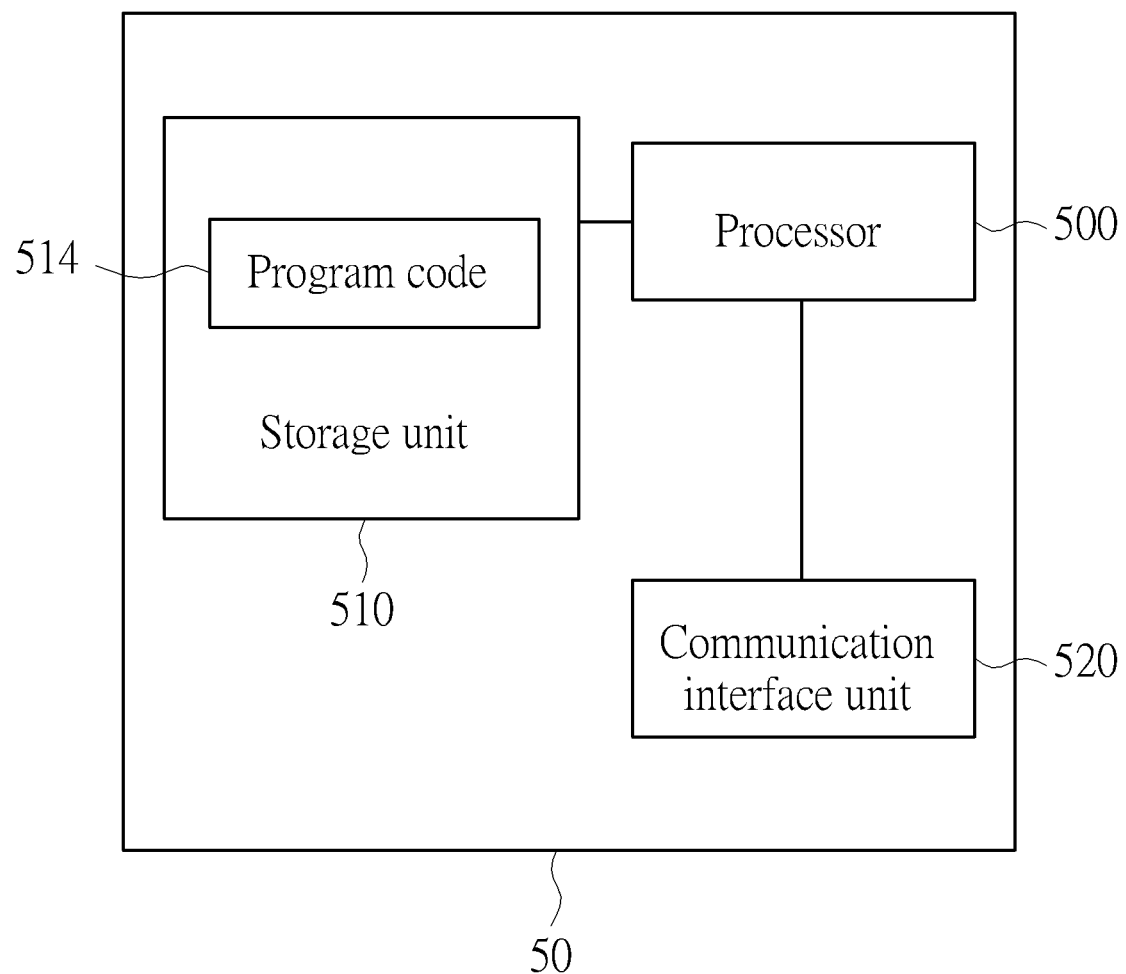
FIG. 5 is a schematic diagram of a communication device according to an embodiment of the invention.

FIG. 5 is a schematic diagram of a communication device 50 according to an embodiment of the invention. The communication device 50 may be the scheduler end SCH, the transmitter end TX or the receiver end RX shown in FIG. 1. The communication device 50 includes a processor 500, such as a microprocessor or an application-specific integrated circuit (ASIC), a storage unit 510 and a communication interface unit 520. The storage unit 510 may be any data storage devices for storing the program code 514 for the processor 500 to access with. For example, the storage unit 510 may be a subscriber identity module (SIM), a read-only memory (ROM), a random-access memory (RAM), CD-ROMs, magnetic tapes, a hard disks or optical data storage devices, and not limited to the mentioned storage devices. The sidelink communication processes 3 and 4 maybe compiled into the program code 514 to instruct the scheduler end SCH, the transmitter end TX or the receiver end RX to perform sidelink communications accordingly. The communication interface entity 520 may be a wireless transceiver for exchanging wireless signals with the corresponding communication devices according to the processing result of the processor 500.

To sum up, the present invention aims at enabling sidelink communications between the user equipment (including the scheduler end, the transmitter end and the receiver end) without the control of the base station. In one embodiment, the scheduler end is configured to allocate the resources for initial/repeated transmissions and ACK/NACK messages, and also transmit information regarding the allocated resources to both the transmitter end and the receiver end. In one embodiment, retransmission is performed when none of the scheduler and transmitter ends has received the ACK message sent by the receiver end, so as to minimize redundant retransmission in consideration of transmission reliability. In one embodiment, retransmission is performed when at least one of the scheduler and transmitters end has received the NACK message sent by the receiver end before the retransmission timer has reached to zero, so as to minimize transmission latency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of sidelink communication for a first user equipment being a scheduler end in a wireless communication system, comprising:
    allocating resources for an initial transmission according to a transmission request sent by a second user equipment being a transmitter end in the wireless communication system, and starting a retransmission timer;
    at a round trip time, checking whether an acknowledgment (ACK) message or a negative-acknowledgment (NACK) message or none of them is received from a third user equipment being a receiver end in the wireless communication system; and
    determining whether to perform a retransmission according to the ACK message, the NACK message and the retransmission timer;
    wherein the retransmission timer is terminated in response to whether the retransmission is performed;
    wherein determining whether to perform the retransmission according to the ACK message, the NACK message and the retransmission timer comprises:
        allocating resources for the retransmission to the transmitter end and the receiver end in response to determining that none of the ACK and NACK messages is received and the retransmission timer has reached to zero; and
        at the round trip time, checking whether the ACK and NACK messages or none of them is received again in response to determining that the retransmission timer has not reached to zero;
    wherein after allocating resources for the retransmission to the transmitter end and the receiver end, the method further comprises:
        checking whether the retransmission is performed by performing a channel test to a sidelink channel on which the retransmission is performed, wherein the retransmission is performed in response to determining that a channel power of the sidelink channel does reach to a predetermine threshold;
        at the round trip time, checking whether the ACK and NACK messages or none of them is received again in response to determining that the retransmission is performed; and
        terminating the retransmission timer and not allocating the resources for the retransmission in response to determining that the retransmission is not performed.

2. The method of sidelink communication of claim 1, wherein determining whether to perform the retransmission according to the ACK message, the NACK message and the retransmission timer further comprises:
   terminating the retransmission timer and not performing the retransmission in response to determining that the ACK message is received at the round trip time before the retransmission timer has reached to zero; and
   allocating resources for the retransmission to the transmitter end and the receiver end and restarting the retransmission timer in response to determining that the NACK message is received before the retransmission timer has reached to zero.

3. A method of sidelink communication for a first user equipment being a transmitter end in a wireless communication system, comprising:
   performing an initial transmission to a second user equipment being a receiver end in the wireless communication system according to allocated resources from a third user equipment being a scheduler end in the wireless communication system, and starting a retransmission timer;
   at a round trip time, checking whether an acknowledgment (ACK) message or a negative-acknowledgment (NACK) message or none of them is received from the receiver end; and
   determining whether to perform a retransmission according to the ACK message, the NACK message and the retransmission timer;
   wherein the retransmission timer is terminated in response to whether there is resource allocated from the scheduler end;
   wherein determining whether to perform the retransmission according to the ACK message, the NACK message and the retransmission timer comprises:
      checking whether the retransmission timer has reached to zero in response to determining that none of the ACK and NACK messages is received from the receiver end at the round trip time; and
      checking whether the ACK and NACK messages or none of them is received again in response to determining that the retransmission timer has not reached to zero;
   wherein when the retransmission timer has reached to zero, the method further comprises:
      checking whether there are resources for the retransmission allocated from the scheduler end by performing a channel test to a sidelink channel on which the retransmission is performed, wherein the retransmission is performed in response to determining that a channel power of the sidelink channel does reach to a predetermine threshold;
      starting the retransmission timer and performing the retransmission to the receiver end according to allocated resources from the scheduler end in response to determining that there are resources allocated from the scheduler end; and
      terminating the retransmission timer and not performing the retransmission in response to determining that there is no resource allocated from the scheduler end.

4. The method of sidelink communication of claim 3, wherein determining whether to perform the retransmission according to the ACK message, the NACK message and the retransmission timer further comprises:
   terminating the retransmission timer and not performing the retransmission in response to determining that the ACK message is received at the round trip time before the retransmission timer has reached to zero; and
   requesting resources for the retransmission in response to determining that the NACK message is received at the round trip time before the retransmission timer has reached to zero.

* * * * *